United States Patent [19]
Tisbo et al.

[11] Patent Number: 6,079,719
[45] Date of Patent: Jun. 27, 2000

[54] STORAGE CART

[75] Inventors: Thomas A. Tisbo, Barrington Hills; Steven P. Whitehead, Elgin; Torrence C. Anderson, Aurora; Jed C. Richardson, Batavia, all of Ill.

[73] Assignee: Suncast Corporation, Batavia, Ill.

[21] Appl. No.: 09/098,152

[22] Filed: Jun. 16, 1998

[51] Int. Cl.[7] .................................................. B62B 3/02
[52] U.S. Cl. ........................... 280/47.35; 280/47.19; 280/79.2; 280/79.3
[58] Field of Search .................... 280/79.2, 79.3, 280/79.11, 47.34, 47.35, 47.19; 312/257.1, 350; D34/17, 19, 20, 21; 211/94.01, 162, 189

[56] References Cited

U.S. PATENT DOCUMENTS

| | | |
|---|---|---|
| D. 275,044 | 8/1984 | Hampshire et al. . |
| D. 300,491 | 4/1989 | Grossman . |
| D. 325,800 | 4/1992 | Kelley . |
| D. 327,967 | 7/1992 | Hikawa . |
| D. 341,459 | 11/1993 | Yang . |
| D. 341,914 | 11/1993 | Reiner . |
| D. 344,382 | 2/1994 | Conaway et al. . |
| D. 349,594 | 8/1994 | Bonazza . |
| D. 381,168 | 7/1997 | Delmerico et al. . |
| 4,384,746 | 5/1983 | Ferdinand et al. ................... 308/3.6 |
| 4,620,637 | 11/1986 | Karashima ............................ 211/188 |
| 4,749,204 | 6/1988 | Raw .................................. 280/79.11 |
| 4,898,294 | 2/1990 | Jennings . |
| 4,961,505 | 10/1990 | Moeller ............................... 211/70.8 |
| 4,998,023 | 3/1991 | Kitts .................................. 280/47.35 |
| 5,011,240 | 4/1991 | Kelley et al. . |
| 5,016,948 | 5/1991 | Welch et al. . |
| 5,294,009 | 3/1994 | Maurer et al. . |
| 5,498,073 | 3/1996 | Charbonneau et al. ............. 312/257.1 |
| 5,524,322 | 6/1996 | Muehlen ..................................... 16/29 |
| 5,531,464 | 7/1996 | Maurer et al. . |
| 5,662,343 | 9/1997 | Mogensen et al. ................ 280/79.11 |
| 5,695,205 | 12/1997 | Liu . |
| 5,704,699 | 1/1998 | Pagelow et al. ................... 312/257.1 |
| 5,716,116 | 2/1998 | Carlson et al. ........................ 312/280 |
| 5,887,878 | 3/1999 | Tisbo et al. ........................ 280/47.19 |
| 5,899,469 | 5/1999 | Pinto et al. ........................ 280/79.11 |

OTHER PUBLICATIONS

A1 Circular, DickBlick Company, (pp. 430–431), Undated.
A2 Miscellaneous Circular, (1 pg.), Undated.
A3 C&H Circular, (1 pg.), Undated.
A4 Amco Corp.® Circular, (2 pgs.), Undated.
A5 M2L Inc. Advertisement, *Metropolis Publication*, (1 pg.), Sep. 1997.
A 6 Max® Utility Racks and Carts Circular, ( 1 pg.), Undated.

*Primary Examiner*—Eric Culbreth
*Assistant Examiner*—L. Lum
*Attorney, Agent, or Firm*—Welsh & Katz, Ltd.

[57] ABSTRACT

A cart for carrying at least one removable bin or shelf includes molded base and top panels each having a plurality of clamping members, and a pair of support rail assemblies extending between and connecting the top panel and the base panel. The support rail assemblies are in spaced, parallel relation to one another and include a pair of parallel support posts and a plurality of parallel rails extending between and connecting the support posts. The rails are mounted to the support posts perpendicular thereto. The support posts are received in and secured to the base and top panels at the clamping members. The rails are configured for slidingly receiving and supporting the shelf or bin thereon. The cart includes a plurality of casters mounted to the base panel for mobility of the cart.

14 Claims, 6 Drawing Sheets

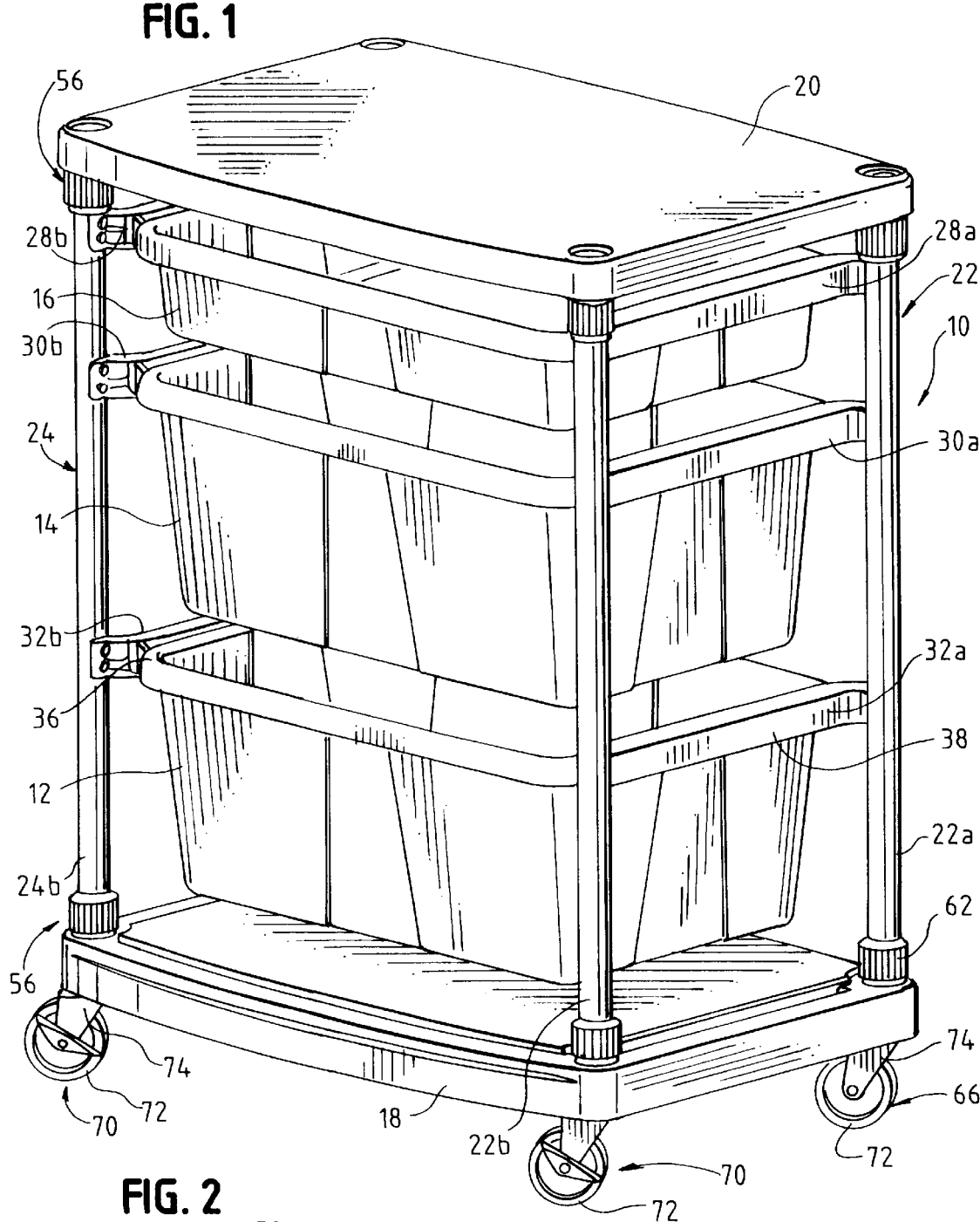

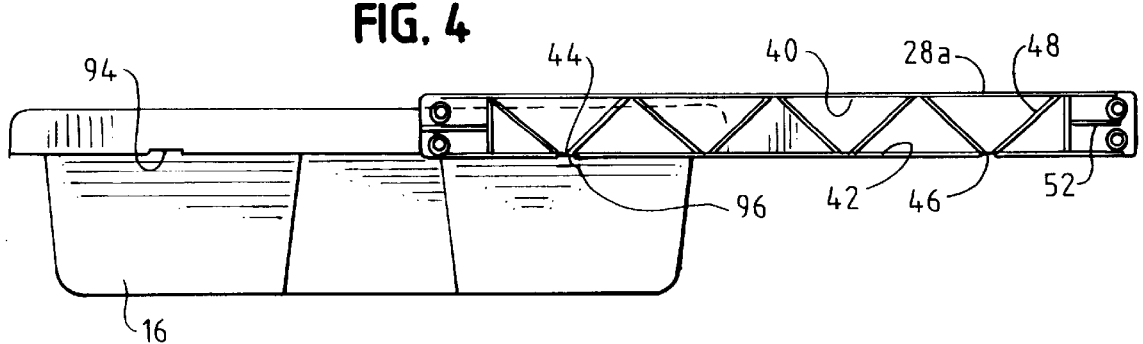
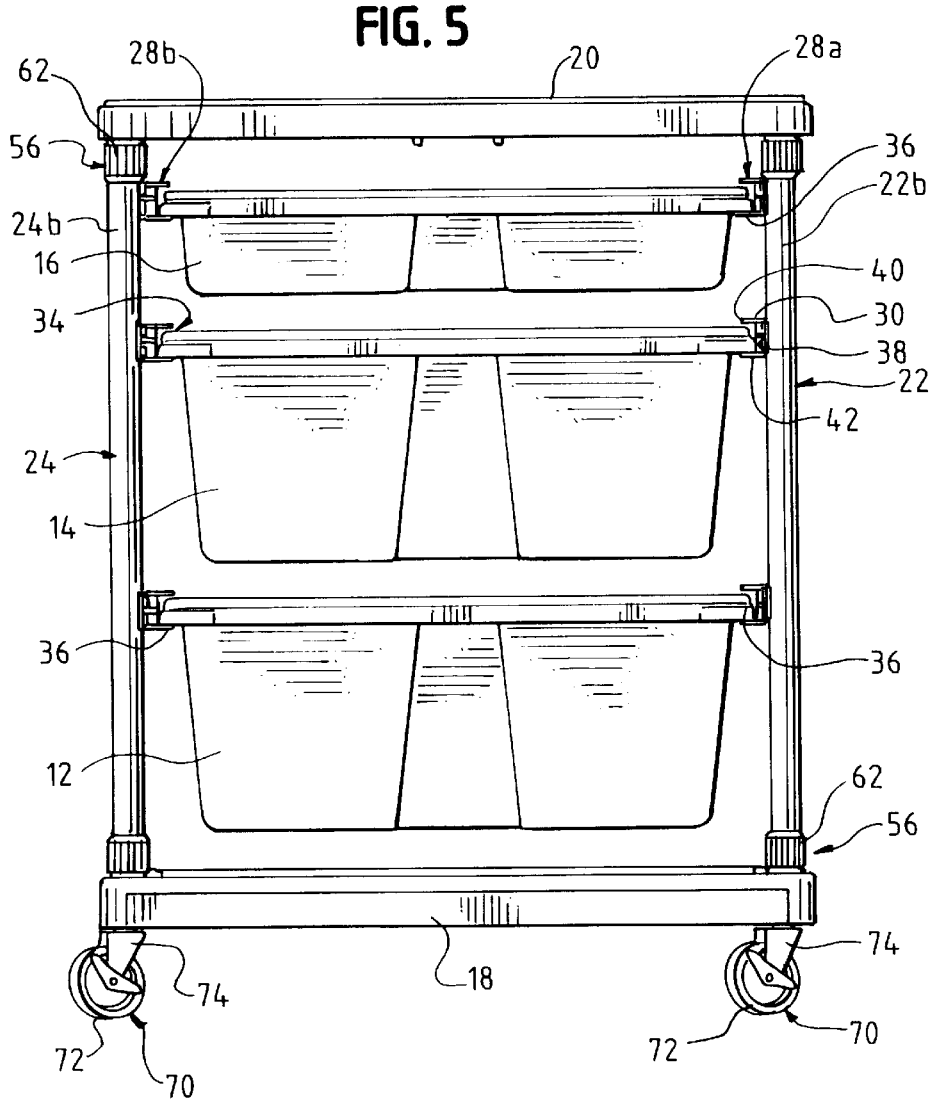

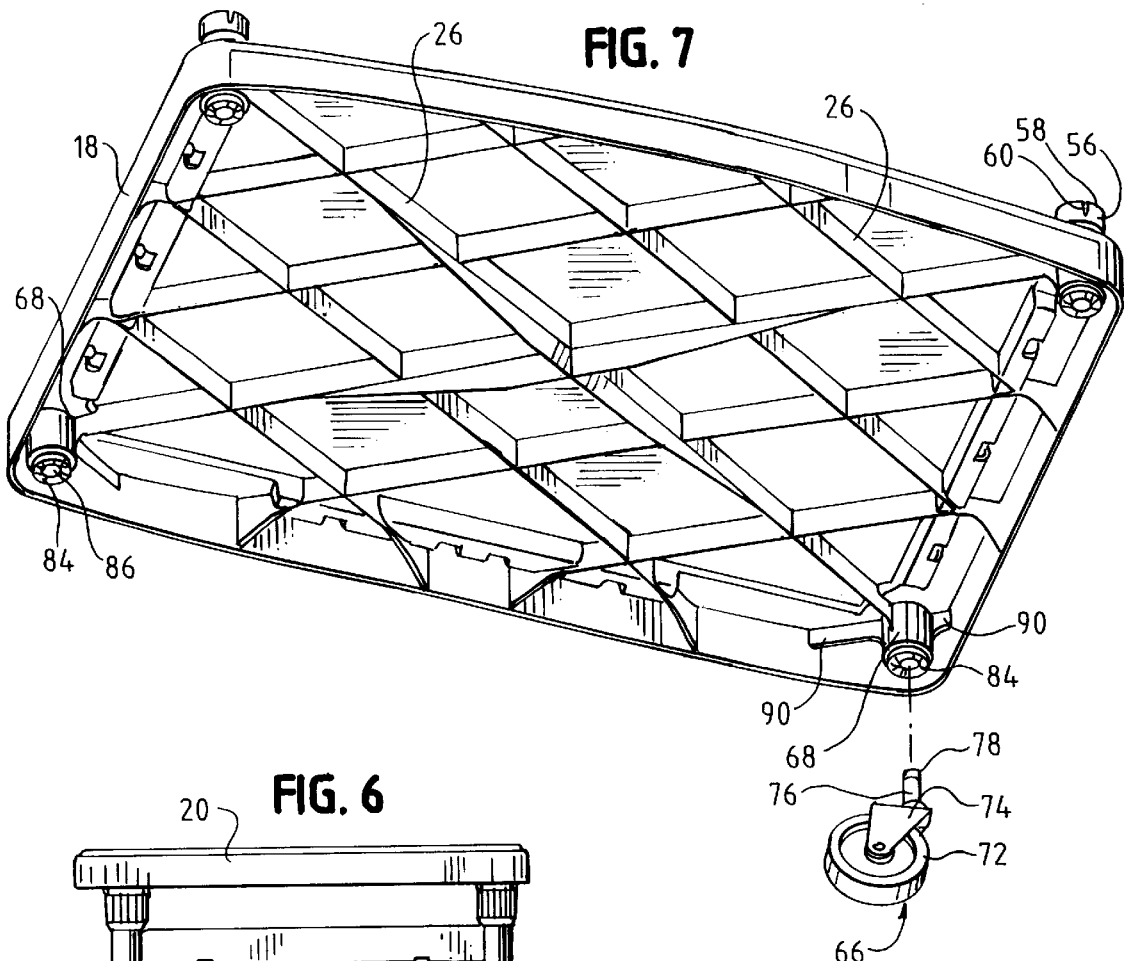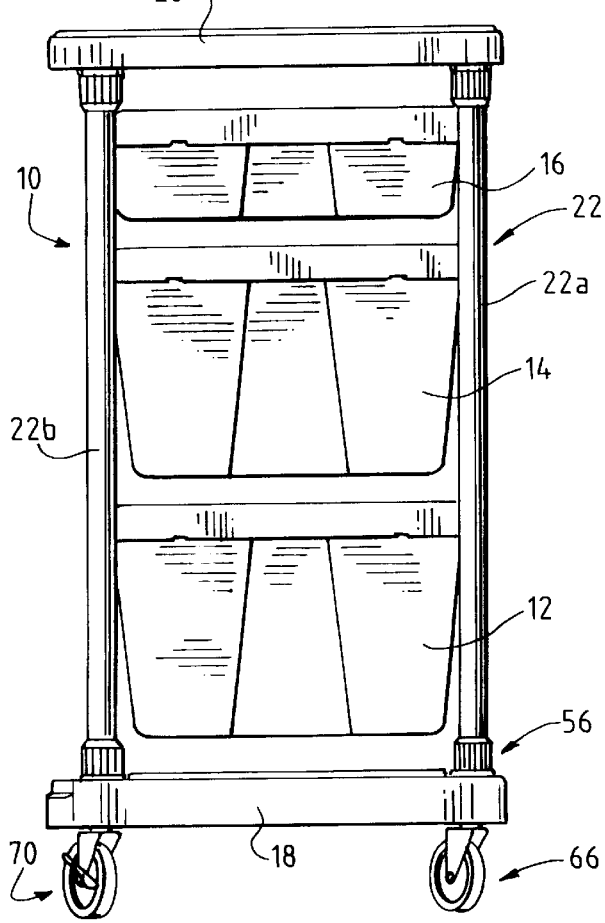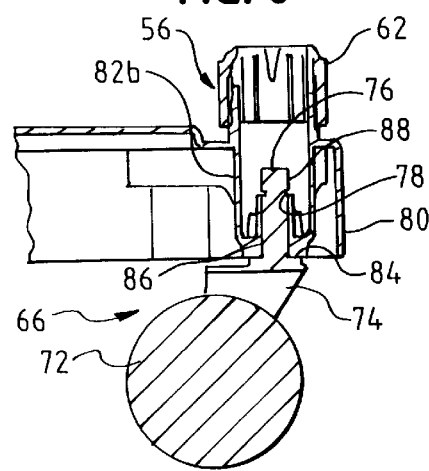

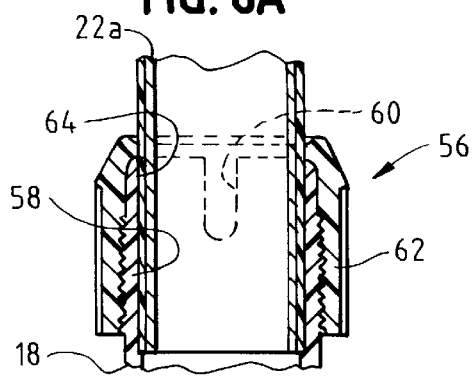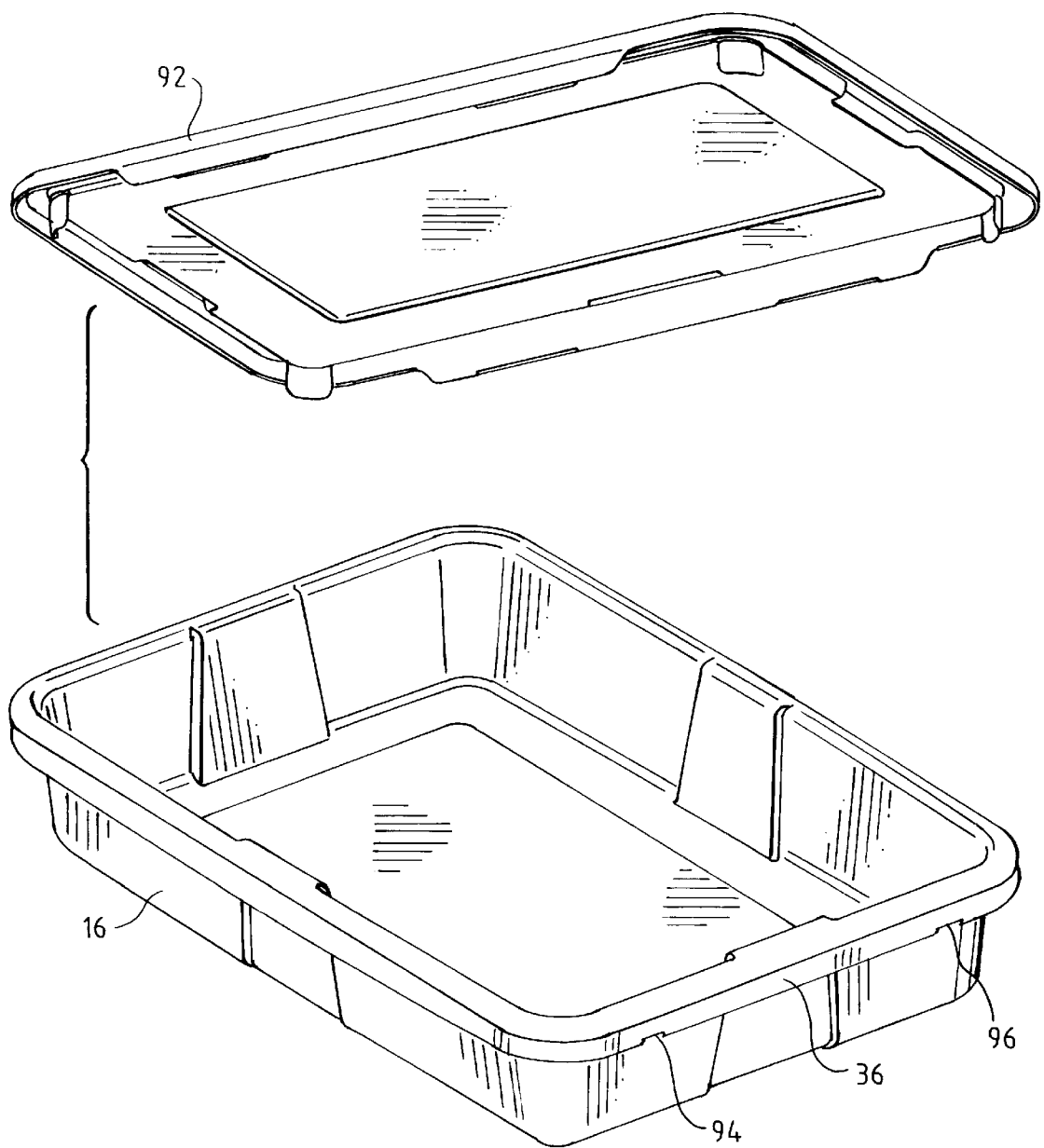

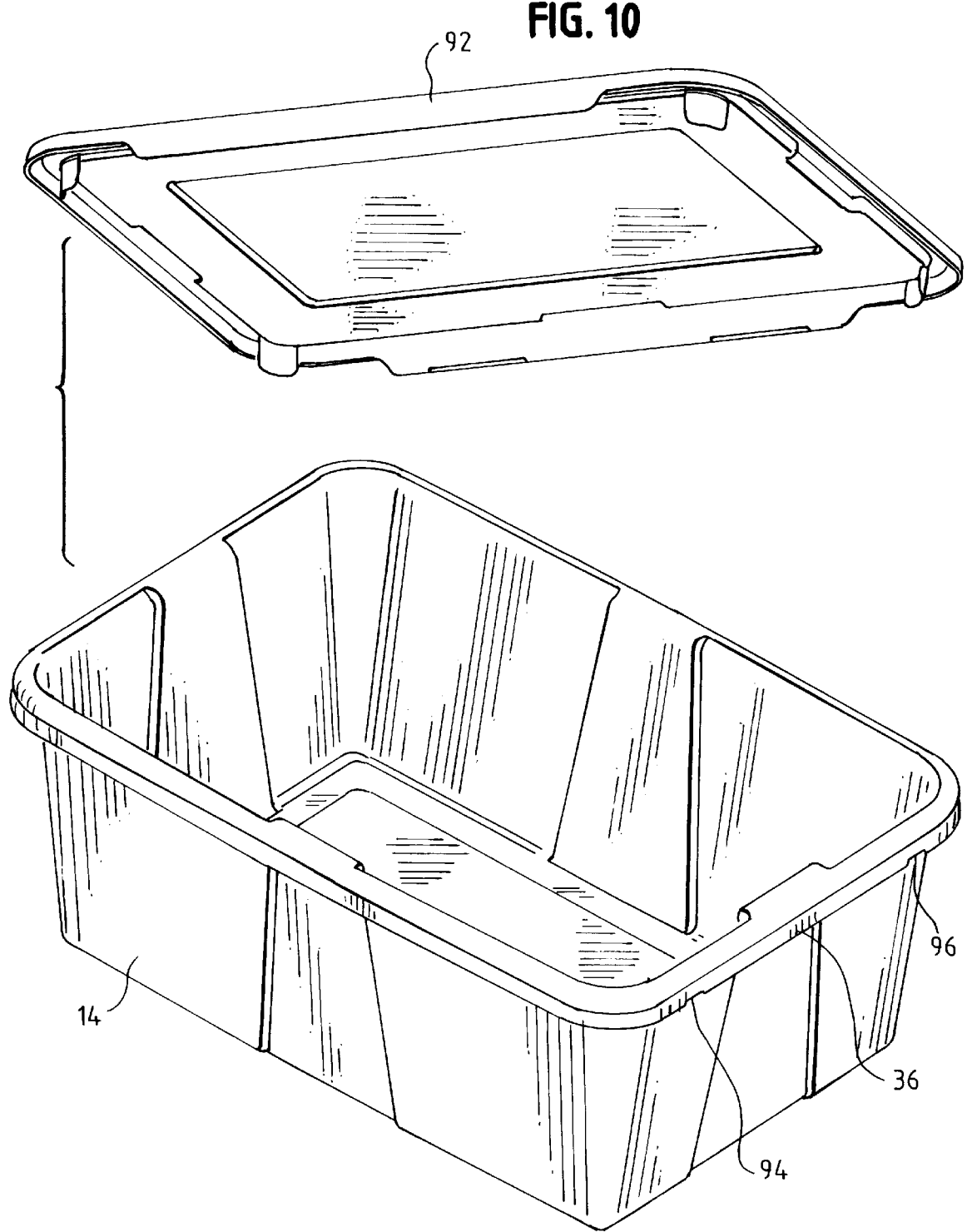

6,079,719

STORAGE CART

FIELD OF THE INVENTION

This invention pertains to carts. More particularly, the invention pertains to wheeled carts formed from molded structural panels, reinforced steel supports, and reinforcing rails.

BACKGROUND OF THE INVENTION

Rolling carts are well-known in the art. Such carts vary from inexpensive, consumer-oriented products to those carts produced for commercial or industrial use that are considerably more rugged and consequently more expensive. Such carts may be fabricated having fixed shelves and/or removable shelves and bins that can be used for storage of items carried by the cart.

Typically, these carts are formed of either steel or polymeric and/or resinous materials. The carts can include fixed or rotating casters for mobility of the cart. Some known carts include a plurality of vertically oriented stacks of bins to increase the storage accommodations of the cart.

Typically, the carts are available either in a fully assembled fashion, or in a "to-be" assembled manner. Those that must be assembled typically include numerous small parts and other hardware items that can be readily lost or misplaced while assembling the cart.

While these carts are clearly very useful for a variety of functions, they all have their drawbacks. First, carts manufactured from all steel can be quite heavy and cumbersome, and can be subject to denting, scratching, or material degradation. The plastic or polymeric carts, are less susceptible to degradation and denting or scratching, however, such carts can require additional reinforcement, for example, at corner locations, to prevent the cart from sagging or bowing at the sides.

Accordingly, there is a need for a cart that is cost effective to produce and use, that is generally lightweight, yet sufficiently strong to prevent deformation of the cart as a result of loads to which it may be subjected. Desirably, such a cart includes a work-top to permit a user to utilize the top for a variety of work functions, and for storage of items. Most desirably, such a cart is readily assembled without tools, and includes a minimal number of small hardware items that can otherwise become lost or misplaced.

SUMMARY OF THE INVENTION

A cart for carrying at least one removable bin or shelf includes molded base and top panels each having corresponding clamping members. The base and top panels are mounted in spaced, parallel relation to one another. A pair of support rail assemblies extend between and connect the top panel and the base panel. The support rail assemblies are in spaced, parallel relation to one another, and include a pair of parallel support posts and a plurality of parallel rails extending between and connecting the support posts.

The rails are mounted to the support posts perpendicular thereto. The support posts are received in and secured to the base and top panels at the clamping members. The rails are configured for slidingly receiving and supporting the shelf or bin thereon. The bin or shelf locks into the rails at two discrete positions, including a first position in which the bin is fully inserted into the cart and a second position in which the bin is lock within the rails and extends partially from the cart.

The dual-position locking arrangement is provided by a pair of stops symmetrically formed in each rail and a pair of stop engaging elements formed in each bin. The stops and stop engaging elements coact to define the two positions of the bin relative to the rails.

The cart includes a plurality of casters mounted to the base panel. The casters are mounted to the base panel at caster mounts formed therein so as to locking secure casters to the panel. The caster mounts are spaced from respective edges of the base panel to prevent damage to the caster mounts. Preferably, the base panel includes reinforcing ribs extending between the caster mounts and the cart edges.

In a preferred embodiment, the cart rails are offset inwardly of the support posts to define a track in spaced relation to and inwardly of the support posts. The arrangement prevents the bins or shelves from contacting the support posts.

In a current embodiment, the clamping members include a partially threaded sleeve formed in and extending from the base and top panels and a threaded nut configured for engaging the sleeve. The sleeve includes longitudinal slots formed therein so as compress inwardly when the nut is threaded thereon. In this manner, the sleeve compresses onto the post and secures the post to the sleeve and the base or top panel.

In a preferred embodiment, the top and base panels include a plurality of reinforcing ribs formed in an underside thereof. Most preferably, the rails define horizontal upper and lower guide walls and a vertical guide wall extending between and connecting the upper and lower guide walls and the rails likewise include a plurality of ribs formed therein extending between the upper and lower guide walls.

These and other features and advantages of the present invention will be apparent from the following detailed description, the accompanying drawings and the appended claims.

BRIEF DESCRIPTION OF THE FIGURES

FIG. 1 is a front perspective view of a three-drawer, rolling cart embodying the principles of the present invention;

FIG. 2 is an enlarged, perspective view of a mounting detail for mounting the drawer rails to the steel support posts of the cart;

FIG. 3 is a perspective, detailed view of the drawer rail of the cart;

FIG. 4 is a side view, shown in partial cross-section, of a drawer or bin positioned along one of the rails of the cart;

FIG. 5 is a front view of the cart of FIG. 1;

FIG. 6 is a side view of the cart;

FIG. 7 is a bottom perspective view of the base of the cart illustrating the reinforced panel structure and the mounting of a caster therein;

FIG. 8 is a partial cross-sectional view of a caster mounting arrangement and support post clamping arrangement for the cart of FIG. 1;

FIG. 8A is a partial cross-sectional view of the support post clamping arrangement of the cart of FIG. 1; and FIGS. 9–12 illustrate various embodiments of drawers or bins that can be used with the present cart.

DETAILED DESCRIPTION OF THE PREFERRED EMBODIMENTS

Figure 11:
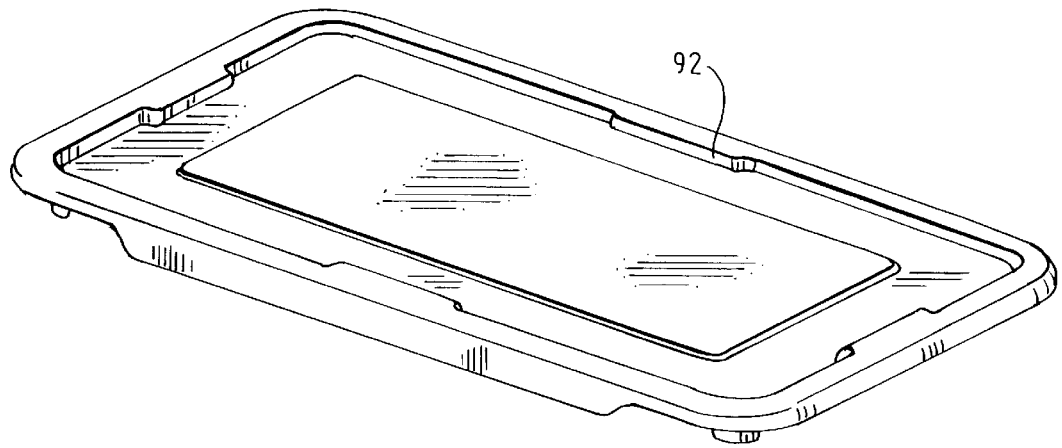

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring now to the figures and particularly to FIG. 1 there is shown a rolling cart 10 in accordance with the principles of the present invention. The exemplary cart 10 includes at least one storage element, such as the three exemplary bins 12, 14, 16, however, those skilled in the art will recognize that the cart 10 can be configured with any number of bins and/or shelves (not shown).

The cart 10 includes a molded base 18, a molded top 20, and a pair of side-support assemblies 22, 24 extending between and connecting the base 18 and top 20. The base and top panels 18, 20 are molded from a polymeric or resinous material for strength, light weight, durability and resistance to adverse environments. The base and top panels 18, 20 are molded with reinforcing ribs 26 extending across essentially the entire underside of each of the panels 18, 20. In a current embodiment, as illustrated in FIG. 7, the reinforcing ribs 26 are formed in a diagonal checkerboard-like manner at the undersides of both of the panels 18, 20.

The side-support assemblies 22, 24 each include a pair of vertical, parallel steel tubular members or posts 22a,b and 24a,b that provide corner support for the cart 10. A plurality of rails 28a,b, 30a,b and 32a,b extend between the posts 22a,b, 24a,b and provide an enveloping track 34 for accommodating the edges or side lips of bins 12–16 or drawers within the rails 28–32. The rails 28–32 also provide structural stability to the cart 10 overall by connecting and maintaining the support posts 22a and 22b, and 24a and 24b of each side-support assembly 22, 24 fixed relative to one another.

The track 34 has a generally square-cornered C-shape defined by a vertical centering wall 38 and upper and lower guide walls 40, 42, respectively. The walls 38–42 maintain the bin 12–16 or shelf securely within the track 34. The lower guide wall 42 is configured for resting thereon the bin lip 36 or the shelf edge. The upper guide wall 40 provides an upper restraint so that the bin 12–16 or shelf cannot be inadvertently hit or knocked upward off of the rail 28–32. The lower guide walls 42 include a pair of symmetrically located projection-like stops 44, 46 that extend upwardly therefrom to provide a detent to maintain the bins 12–16 or shelves in a locked position when fully inserted into the cart 10.

As will be apparent from the drawings, the bins 12–16 can be removed from the cart 10 from either side. This arrangement permits ready access to the bins 12–16, and the items that may be stored therein. The rails 28–32 can include reinforcing/centering ribs 48 (best seen in FIG. 3), extending preferably diagonally between the upper and lower walls 40, 42, that provide structural support for the rails 28–32 and further facilitate maintaining the bins 12–16 centered between corresponding rail pairs.

The rails 28–32, which can be formed from a polymeric/resin material or formed from a metal such as steel or aluminum, are secured to the corner support posts 22a,b, 24a,b by any of a number of means, such as the illustrated mechanical fasteners 50. As can be seen from the drawings, the rails 28–32 include a corner gusset 52 for added strength. The rails 28–32 are inwardly offset relative to the support posts 22a,b, 24a,b, to assure that the bins 12–16 will fit between the side-support assemblies 22, 24, and will not extend beyond or contact the support posts 22a,b, 24a,b. The corner gussets 52 are further configured to facilitate center-ing the bin 12–16 or shelf within the rails 28–32 when sliding the bin or shelf into or out of the cart 10.

The support posts 22a,b, 24a,b are secured to the base and top panels 18, 20 by a clamping configuration as indicated at 56. The clamping configuration 56, as best seen in FIG. 8A, includes a partially threaded sleeve 58 extending from the panel (as illustrated with reference to the base panel 18), which sleeve 58 includes longitudinal slots 60 formed therein. The clamping member 56 further includes a knurled, fluted, internally threaded coupling nut 62 having an inwardly tapered inner surface 64, that securely threadedly engages the sleeve 58. As the nut 62 threads onto the sleeve 58, the tapered inner surface 64 compresses the sleeve 58 about the slots 60 and thus clamps the sleeve 58 onto the exemplary support post 22a, securing the post 22a within the clamp 56 and thus to the base 18.

Referring now to FIGS. 7 and 8, there is shown the caster 66 and caster mount 68 portion of the base panel 18. The casters 66 are of a relatively common type and can be present as one or more locking casters (indicated at 70) to lock the caster and thus the cart 10 at a desired location and to prevent the cart 10 from inadvertently rolling. Each caster 66 includes a wheel 72 rotatably mounted to a wheel support 74. A post 76 extends from the wheel support 74 and can include one or more circumferencially formed grooves 78 therein. The post 76 inserts and locks into the caster mount 68. The mount 68 is reinforced and is in spaced relation to the edge 80 of the base panel 18 to prevent the mount 68 from being struck and the material forming the mount 68 inadvertently broken.

The mount 68 includes an outer sleeve portion 82 that is essentially an extension of the post clamp sleeve 58 that extends from the base panel 18. The downwardly oriented caster mount 68 includes a bearing surface 84 against which the wheel support 74 rests. The bearing surface 84 has an opening therein for receiving the caster support post 76. The circumferential grooves 78 on the post 76 coact with an engaging element 88 within the caster mount 68 to provide a snap-type fit of the post 76 within the mount 68. This arrangement maintains the caster 66 lockingly engaged with the caster mount 68, and thus the base panel 18, so that as the cart 10 is raised off of the ground, the casters 66 remain mounted to the base 18. As shown in FIGS. 7 and 8, additional reinforcing ribs 90 extend about the caster mount 68 at the base 18 underside to provide increased structural integrity and strength to the mount 68, to that portion of the base panel 18 from which the mount 68 extends, and to the surrounding areas of the base 18.

Figure 12:
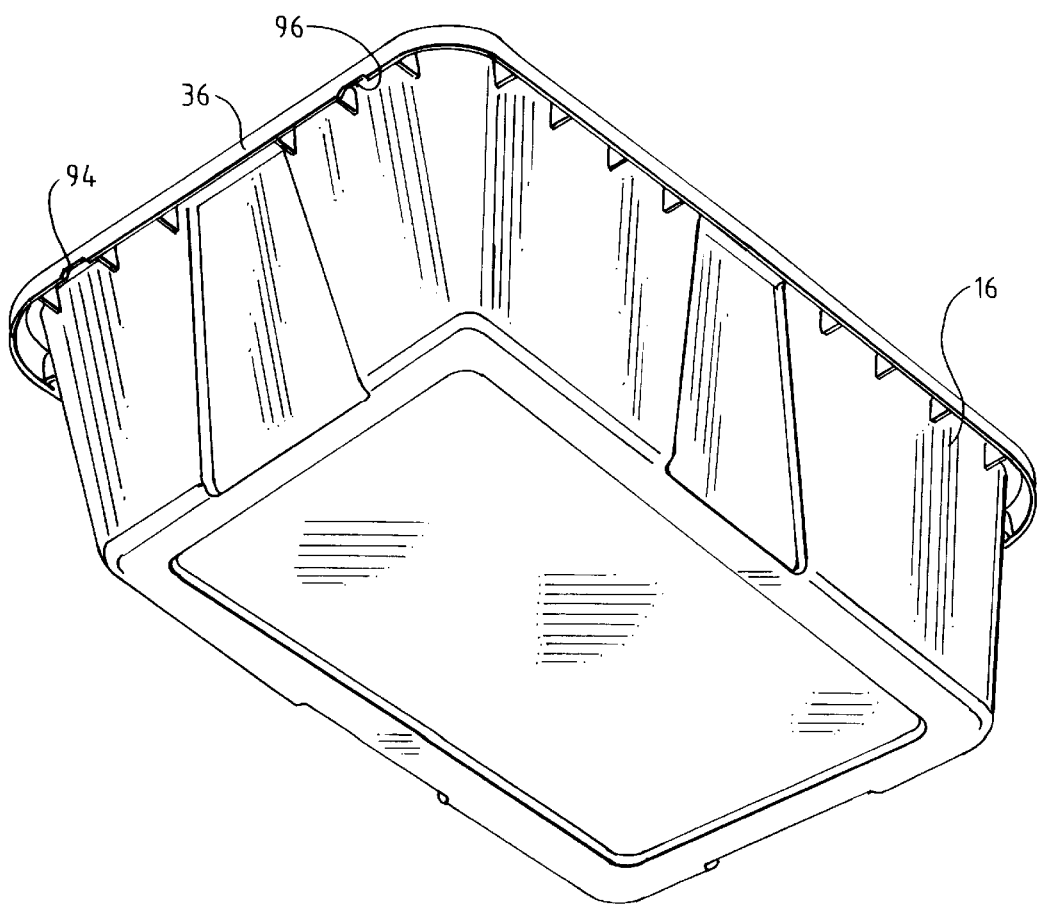

Referring now to FIGS. 9 through 12, there is shown a variety of different sized bins 12–16 that can be used with the present cart 10. In a contemplated arrangement, the cart includes three bins, as shown in FIG. 1, in which equal-sized, deep bins 12–14 are positioned within the lowermost and intermediate rails 30, 32, and a least-depth bin 16 is positioned within the uppermost rails 28. It will, of course, be recognized by those skilled in the art that the rails 28–32 can be provided at a variety of heights along the support posts 22a,b, 24a,b to accommodate bins 12–16 of varying sizes and/or shelves within the cart 10.

In a most preferred arrangement, each of the bins is fitted with a top cover 92, as shown in FIG. 9 through 12. Preferably, the covers 92 secure tightly to their respective bins 12–16 to limit the environmental effects on items stored within the bins 12–16. Most preferably, the covers 92 snap-lock on to their respective bins 12–16 so that the bins 12–16 can be removed from the cart 10 and the covers 92 remain affixed thereto. The bins 12–16 each include a pair of notches 94, 96 (best seen in FIGS, 4 and 10–12) that are positioned to coact with the rails stops 44, 46. The notches 94, 96 and stops 44, 46 are advantageously configured so that the stops 44, 46 provide a "locked" position for the bins 12–16 when fully inserted into or centered in the cart 10. In order to remove a bin, for example bin 16 from the cart 10, a user is required to urge the bin 16 outwardly along the rails 28, over both stops 44, 46. If one desires to look inside the covered bin 16, one is required only to pull the bin 16 over a first stop, for example first stop 44, until notch 96 engages second stop 46. In this position, the bin 16 remains resting on and secured within the rails 28, while the bin cover 92 can be partially opened to view the contents of the bin 16.

From the foregoing, it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appending claims all such modifications as fall within the scope of the claims.

What is claimed is:

1. A cat for carrying at least one removable bin or shelf, the cart comprising:

a molded base panel having a plurality of clamping members and base panel edges;

a molded top panel in spaced, parallel relation to the base panel, the top panel having a plurality of clamping members, each corresponding to a clamping member on the base panel;

a pair of support rail assemblies extending between and connecting the top panel and the base panel, the support rail assemblies being in spaced, parallel relation to one another, each support rail assembly including a pair of parallel support posts and a plurality of parallel rails extending between and connecting the support posts, each rail having curved ends and a linear portion between the ends defining an offset inward of the support posts, the rails being defined by upper and lower guide walls and a vertical guide wall therebetween, the rails being mounted to to support posts perpendicular thereto, wherein the support posts are received in and secured to the base and top panels at the clamping members, wherein each rail is in facing relation to a complementary parallel rail to define a track in spaced relation to and inwardly of the support posts, the track configured for slidingly receiving and supporting the shelf or bin thereon; and a plurality of casters mounted to the base panel.

2. The cart in accordance with claim 1 wherein each rail includes at least one upwardly projecting stop formed therein.

3. The cart in accordance with claim 2 wherein each rail includes two stops symmetrically formed therein.

4. The cart in accordance with claim 3 including at least one removable bin, the bin having a plurality of stop engaging elements formed therein and adapted to coact with the rail stops to define at least two discrete positions wherein in a first position the bin is fully inserted into the cart onto the parallel rails and in the second position the bin is lock therein and extending partially from the cart.

5. The cart in accordance with claim 1 wherein the base panel includes a plurality of caster mounts formed therein so as to locking secure casters therein, the caster mounts being spaced from respective edges of the base panel.

6. The cart in accordance with claim 5 including reinforcing ribs extending between the caster mounts and the base panel edges.

7. The cart in accordance with claim 1 wherein at the clamping members include a partially threaded sleeve formed in and extending from the base and top panels and a threaded nut having a tapered top and a body wherein the tapered top portion has a smaller diameter than the body of the nut and the threaded portion of the sleeve, wherein the threaded nut is configured for engaging the sleeve, the sleeve including longitudinal slots formed therein, wherein the slots are compressed inwardly by the tapered top when the nut is threaded thereon, the sleeve being further configured for receiving the support post therein and for securing the support post thereto as the nut is threaded onto the sleeve and the sleeve compresses onto the post.

8. The cart in accordance with claim 1 wherein the top and base panels include a plurality of reinforcing ribs formed in an underside thereof.

9. The cart in accordance with claim 1 wherein each rail includes a plurality of ribs formed therein, the ribs extending between the upper and lower guide walls.

10. The cart in accordance with claim 9 wherein the ribs extend diagonally between the upper and lower guide walls.

11. The cart in accordance with claim 1 wherein each rail includes at least one upwardly projecting stop formed therein, and wherein the cart includes at least one removable bin, the bin having at least one stop engaging element formed therein and adapted to coact with the rail stop, and wherein the stop engaging element cooperates with the rail stop to restrict lateral movement of the removable bin.

12. The cart in accordance with claim 1 wherein each rail includes at least one upwardly projecting stop formed therein, and wherein the cart includes at least one removable bin, the bin having a plurality of stop engaging elements formed therein and adapted to coact with the rail stops to define at least two discrete positions, wherein in a first position the bin is fully inserted into the cart onto rails and in a second position the bin is locked therein and extends partially from the cart, wherein the stop engaging elements cooperate with the rail stop to restrict lateral movement of the removable bin.

13. The cart in accordance with claim 1 wherein each rail includes two upwardly projecting stops formed therein, and wherein the cart includes at least one removable bin, the bin having a plurality of stop engaging elements formed therein and adapted to coact with the rail stops to define at least two discrete positions wherein in a first position the bin is fully inserted into the cart onto rails and in a second position the bin is locked therein and extends partially from the cart, wherein the stop engaging elements cooperate with the rail stop to restrict lateral movement of the removable bin.

14. The cart in accordance with claim 13 wherein the cart has an anterior and a posterior side, wherein the removable bins may be accessed or removed from the anterior and posterior side of the cart.

* * * * *